United States Patent
Song et al.

(10) Patent No.: US 10,495,799 B2
(45) Date of Patent: Dec. 3, 2019

(54) ULTRA-THIN POLARIZING PLATE AND LIQUID CRYSTAL DISPLAY DEVICE HAVING SAME

(71) Applicant: DONGWOO FINE-CHEM CO., LTD., Iksan-si, Jeollabuk-do (KR)

(72) Inventors: Inkyu Song, Pyeongtaek-si (KR); Jun Hee Sung, Incheon (KR); Jung Ku Lim, Asan-si (KR)

(73) Assignee: DONGWOO FINE-CHEM CO., LTD., Ikan-si (KR)

( * ) Notice: Subject to any disclaimer, the term of this patent is extended or adjusted under 35 U.S.C. 154(b) by 242 days.

(21) Appl. No.: 15/321,949

(22) PCT Filed: Jun. 19, 2015

(86) PCT No.: PCT/KR2015/006221
§ 371 (c)(1),
(2) Date: Dec. 23, 2016

(87) PCT Pub. No.: WO2015/199379
PCT Pub. Date: Dec. 30, 2015

(65) Prior Publication Data
US 2017/0131450 A1    May 11, 2017

(30) Foreign Application Priority Data

Jun. 25, 2014 (KR) .................. 10-2014-0078299

(51) Int. Cl.
| | | |
|---|---|---|
| *G02B 5/30* | (2006.01) | |
| *C08J 5/18* | (2006.01) | |
| *G02B 1/14* | (2015.01) | |
| *G02F 1/1335* | (2006.01) | |
| *B29D 11/00* | (2006.01) | |

(52) U.S. Cl.
CPC ...... *G02B 5/3033* (2013.01); *B29D 11/00644* (2013.01); *C08J 5/18* (2013.01); *G02B 1/14* (2015.01); *G02F 1/133528* (2013.01); *B29D 11/0073* (2013.01); *B32B 2457/202* (2013.01); *C08J 2301/02* (2013.01); *C08J 2333/12* (2013.01); *C08J 2345/00* (2013.01); *C08J 2367/02* (2013.01); *C09J 2203/318* (2013.01); *G02B 5/305* (2013.01); *G02B 5/3041* (2013.01); *G02F 2201/50* (2013.01); *G02F 2201/54* (2013.01); *G02F 2202/28* (2013.01); *Y10T 428/105* (2015.01); *Y10T 428/1036* (2015.01); *Y10T 428/1041* (2015.01); *Y10T 428/1059* (2015.01)

(58) Field of Classification Search
CPC ........ G02B 5/30; G02B 5/3033; G02B 5/305; G02B 5/3041; G02B 1/14; G02F 1/133528; G02F 1/1335; G02F 2201/50; G02F 2201/54; G02F 2202/28; C08J 5/18; C08J 2301/02; C08J 2333/12; C08J 2345/00; C08J 2367/02; C09J 2203/318; Y10T 428/1036; Y10T 428/1041; Y10T 428/1059; Y10T 428/105; B32B 2457/202; B29D 11/00644; B29D 11/0073

See application file for complete search history.

(56) References Cited

U.S. PATENT DOCUMENTS

| | | | |
|---|---|---|---|
| 2007/0048509 A1 | 3/2007 | Yoneyama et al. | |
| 2007/0237966 A1 | 10/2007 | Takao et al. | |
| 2011/0043733 A1* | 2/2011 | Suzuki | C09J 135/04 349/96 |
| 2013/0242397 A1 | 9/2013 | Ogumi et al. | |
| 2015/0146140 A1* | 5/2015 | Saneto | G02B 1/14 349/96 |

FOREIGN PATENT DOCUMENTS

| | | | | |
|---|---|---|---|---|
| KR | 10-2007-0017040 A | | 2/2007 | |
| KR | 10-2008-0059879 A | | 7/2008 | |
| KR | 10-2010-0084290 A | | 7/2010 | |
| KR | 20100078564 A | * | 7/2010 | |
| KR | 101008869 | | 1/2011 | |
| KR | 10-2013-0105510 A | | 9/2013 | |
| TW | 200639454 | | 11/2006 | |
| TW | 201028292 | | 8/2010 | |
| TW | 201534478 | | 9/2015 | |
| WO | WO-2014017541 A1 | * | 1/2014 | .............. G02B 1/14 |

OTHER PUBLICATIONS

International Searching Authority, International Search Report for PCT/KR2015/006221, dated Sep. 22, 2015.
Taiwan Patent Office, Communication dated Nov. 16, 2018 by the Taiwanese Patent Office in TW Application No. 1041206000.

\* cited by examiner

*Primary Examiner* — Eli D. Strah
(74) *Attorney, Agent, or Firm* — Sughrue Mion, PLLC

(57) ABSTRACT

The present invention provides an ultra thin polarizing plate comprising a polarizer, a protective film formed on one surface of the polarizer, and an adhesive layer formed on the other surface of the polarizer, wherein the protective film has a resisting force of 2.1 to 18.7 N, and a liquid crystal display device having the ultra thin polarizing plate. The ultra thin polarizing plate according to the present invention can inhibit curl occurrence to prevent bonding defects by the curl in the process that the polarizing plate is bonded to a liquid crystal cell, and can make the thickness of the protective film thin, and therefore it can be effectively used in a flexible display.

6 Claims, No Drawings

ULTRA-THIN POLARIZING PLATE AND LIQUID CRYSTAL DISPLAY DEVICE HAVING SAME

CROSS REFERENCE TO RELATED APPLICATIONS

This is a National Stage of International Application No. PCT/KR2015/006221 filed Jun. 19, 2015, claiming priority based on Korean Patent Application No. 10-2014-0078299 filed Jun. 25, 2014, the contents of all of which are incorporated herein by reference in their entirety.

TECHNICAL FIELD

The present invention relates to an ultra thin polarizing plate and a liquid crystal display device comprising the same. Particularly, the present invention provides an ultra thin polarizing plate wherein curl occurrence is inhibited, thereby preventing bonding defects by the curl in the process that the polarizing plate is bonded to a liquid crystal cell, and a liquid crystal display device having the ultra thin polarizing plate.

BACKGROUND ART

A liquid crystal display device (LCD) has been utilized in various uses of notebook computers, cellular phones, liquid-crystal-display televisions and the like, and it generally consists of a liquid crystal cell comprising a liquid crystal, a polarizing plate, and an adhesive layer or an unreworkable adhesive layer for joining the liquid crystal cell and the polarizing plate.

Also, the polarizing plate used in the LCD generally has a multi-layered structure including a polarizer (sometimes called 'polarizing film') obtained by adsorbing and aligning an iodine compound or a dichroic polarizing material on a polyvinyl alcohol (PVA)-based resin film which is elongated in a certain direction; first and second triacetyl cellulose (TAC)-based protective films laminated on both surfaces of the polarizer through an unreworkable adhesive so as to protect the polarizer; and an adhesive layer laminated on one surface of any one of the protective films, which is used for fixing the polarizing plate to a liquid crystal cell.

Recently, the slimness of the LCDs is increasingly demanded in slim wall-mounted TVs, mobile computers, TVs for vehicles, the displays of navigation systems for vehicles, cellular phones and the like. In order to achieve the slimness and light weight of the LCDs, it is necessary to provide an ultra thin polarizing plate (UTP) that allows the whole module of the LCDs to be thinner.

There has been proposed a method for preparing such an UTP by removing one of the protective films from the configuration of the polarizing plate. That is, the UTP has a polarizer being directly laminated with an adhesive layer without a separate protective film. However, such an UTP undergoes the occurrence of severe curl, which may cause bubbles or lifting (peeling) in the bonding interface of the UTP and a liquid crystal cell, thereby deteriorating bonding durability and resulting in appearance defects.

Korean Patent No. 10-1008869 discloses a method for preparing a polarizing plate by laminating transparent protective films having different thickness on both surfaces of a polarizer, which control the moisture ratio of both protective films to inhibit curl. However, this method cannot be applied in an UTP having only one protective film.

DISCLOSURE

Technical Problem

It is an object of the present invention to provide an ultra thin polarizing plate wherein curl occurrence is inhibited, thereby preventing bonding defects by the curl in the process that the polarizing plate is bonded to a liquid crystal cell.

It is another object of the present invention to provide a liquid crystal display device having the ultra thin polarizing plate on at least one surface of a liquid crystal cell.

Technical Solution

In accordance with one aspect of the present invention, there is provided an ultra thin polarizing plate comprising a polarizer, a protective film formed on one surface of the polarizer, and an adhesive layer formed on the other surface of the polarizer, wherein the protective film has a resisting force of 2.1 to 18.7 N.

In one embodiment of the present invention, the resisting force of the protective film is defined by the following Equation (1):

$$\text{Force} = E \times \varepsilon \times A \qquad \text{[Equation 1]}$$

wherein,
Force is a resisting force of the protective film,
E is an elastic modulus (MPa) of the protective film,
ε is a shrinkage rate of the polarizer, and
A is a cross-sectional area (mm$^2$) of the protective film.

In accordance with another aspect of the present invention, there is provided a liquid crystal display device having the ultra thin polarizing plate on at least one surface of a liquid crystal cell.

Advantageous Effects

The ultra thin polarizing plate of the present invention wherein the resisting force of a protective film is controlled within the range of 2.1 to 18.7 N can be inhibited in curl occurrence to prevent bonding defects by the curl in the process that the polarizing plate is bonded to a liquid crystal cell, and can make the thickness of the protective film thin. Therefore, the ultra thin polarizing plate can be effectively used in a flexible display.

BEST MODE

The present invention is, hereinafter, described in more detail.

One embodiment of the present invention relates to an ultra thin polarizing plate comprising a polarizer, a protective film formed on one surface of the polarizer, and an adhesive layer formed on the other surface of the polarizer, wherein the protective film has a resisting force of 2.1 to 18.7 N.

In the present invention, the resisting force of the protective film is defined by the following Equation (1):

$$\text{Force} = E \times \varepsilon \times A \qquad \text{[Equation 1]}$$

wherein,
Force is a resisting force of the protective film,
E is an elastic modulus (MPa) of the protective film,
ε is a shrinkage rate of the polarizer, and
A is a cross-sectional area (mm$^2$) of the protective film.

In the present invention, the shrinkage rate of a polarizer and the elastic modulus of a protective film may, without limitation, be measured according to the methods shown in Experimental Examples which will be described below.

In one embodiment of the present invention, the resisting force of the protective film is controlled within the range of 2.1 to 18.7 N, thereby inhibiting curl occurrence and making the thickness of the protective film thin.

<Protective Film>

In one embodiment of the present invention, the protective film is not particularly limited if it has good transparency, mechanical strength, thermal stability, moisture-shielding property, and isotropicity. For example, polyester films such as polyethylene terephthalate, polyethylene isophthalate, polyethylene naphthalate and polybutylene terephthalate; cellulose films such as diacetyl cellulose and triacetyl cellulose; acrylate films such as polymethyl (meth) acrylate and polyethyl (meth)acrylate; styrene films such as polystyrene and acrylonitrile-styrene copolymer; polycarbonate films; polyolefin films such as polyethylene, polypropylene, polyolefin having a cyclic or norbonene structure, and ethylene-propylene copolymer; vinyl chloride films; amide films such as nylon and aromatic polyamide; imide films; polyethersulfone films; sulfone films; polyether ether ketone films; polyphenylene sulfide films; vinyl alcohol films; vinylidene chloride films; polyoxymethylene films; and epoxy films may be used, without limitation. Preferably, polyester films, cellulose films, acrylate films or polyolefin films may be used. The protective film conventionally has a thickness 20 to 500 μm.

The protective film may be prepared by conventional methods known in the art. For example, extrusion molding using melting extrusion such as a T-die or inflation process, cast molding using melting casting process, or calendar molding is preferred. The extrusion molding is favorable in terms of productivity since it does not require steps of drying or scattering an organic solvent, like a dry lamination method. By way of a specific example, in order to mold a film, a (meth)acrylate resin composition as a raw material is supplied into an extruder connected to a T-die, is subject to melting mixing and extrusion, and is cooled with water, followed by drawing. The extruder may have a uni-axial or biaxial screw. Also, additives such as a plasticizer or an anti-oxidant may be added. The extrusion molding may be carried out at a suitable temperature, preferably at 80 to 180° C., more preferably 100 to 150° C. higher than the glass transition temperature of a resin used as a raw material of the protective film. If the temperature of extrusion molding is too low, the flexibility of the resin becomes insufficient, resulting in poor molding property. If the temperature of extrusion molding is too high, the viscosity of the resin is lowered to cause production stability deterioration such as un-uniform thickness in the molded film.

If necessary, a surface-treatment layer such as a hard coating layer, an anti-reflective layer, an anti-glare layer and an anti-static layer may be further laminated on the other surface of the protective film that is not bonded to the polarizer.

<Polarizer>

In one embodiment of the present invention, the polarizer is obtained by adsorbing and aligning a dichroic pigment on a polyvinyl alcohol resin film.

The polyvinyl alcohol resin composing the polarizer may be obtained by saponifying a polyvinyl acetate resin. The polyvinyl acetate resin may be polyvinyl acetate being a homopolymer of vinyl acetate, or a copolymer of vinyl acetate and other monomer copolymerizable with the vinyl acetate. Examples of the other monomer copolymerizable with the vinyl acetate may include unsaturated carboxylic acid, unsaturated sulfonic acid, olefin, vinyl ether, and ammonium group-containing acrylamide monomers. Also, the polyvinyl alcohol resin may be modified, e.g., polyvinyl formal or polyvinyl acetal modified with aldehydes.

The degree of saponification of the polyvinyl alcohol resin conventionally ranges from 85 to 100 mol %, preferably 98 mol % or more. Also, the degree of polymerization of the polyvinyl alcohol resin conventionally ranges from 1,000 to 10,000, preferably 1,500 to 5,000.

Such a polyvinyl alcohol resin is obtained in the form of a film, which is used as a raw film of the polarizer. The method of forming a film from the polyvinyl alcohol resin may be carried out according to various known methods, without limitation. The raw film may have a thickness of 10 to 150 μm, but is not limited thereto.

The polarizer is continuously prepared by bringing the polyvinyl alcohol film into uniaxial stretching in an aqueous solution, dyeing the stretched film with a dichroic pigment, bringing the dyed film into treatment with an aqueous solution of boric acid, and washing and drying the treated film.

The uniaxial stretching of the polyvinyl alcohol film may be carried out before, during or after the dyeing. In the case that the uniaxial stretching is carried out after dying, it may be carried out before or during the treatment with boric acid. Of course, the uniaxial stretching may be carried out in a multi-stage manner. In the uniaxial stretching, rollers with different speed or a heated roller may be used. The uniaxial stretching may be a dry stretching made in the atmosphere or a wet stretching made in the state of swelling in a solvent. The stretch ratio of the polyvinyl alcohol film conventionally ranges from 3 to 8 times.

The dyeing of the stretched polyvinyl alcohol film with a dichroic pigment may be, for example, carried out by immersing the polyvinyl alcohol film in an aqueous solution containing the dichroic pigment. The dichroic pigment may be iodine or a dichroic dye. Also, the polyvinyl alcohol film is preferably pre-immersed in water for swelling, prior to dyeing.

When iodine is used as a dichroic pigment, the dyeing may be conventionally carried out by immersing the polyvinyl alcohol film in a dyeing solution containing iodine and potassium iodide. In the dyeing solution, iodine is conventionally present in an amount of 0.01 to 1 part by weight based on 100 parts by weight of water (distilled water), and potassium iodide is conventionally present in an amount of 0.5 to 20 parts by weight based on 100 parts by weight of water. The temperature of the dyeing solution conventionally ranges from 20 to 40° C., and the time of immersing (dyeing time) conventionally ranges from 20 to 1,800 seconds.

When the dichroic dye is used as a dichroic pigment, the dyeing may be conventionally carried out by immersing the polyvinyl alcohol film in an aqueous solution containing a water-soluble dichroic dye. In the aqueous solution, the dichroic dye is conventionally present in an amount of $1 \times 10^{-4}$ to 10 parts by weight, preferably $1 \times 10^{-3}$ to 1 part by weight, based on 100 parts by weight of water. The aqueous solution may further contain an inorganic salt such as sodium sulfate as a dyeing adjuvant. The temperature of the aqueous solution for dyeing conventionally ranges from 20 to 80° C., and the time of immersing (dying time) conventionally ranges from 10 to 1,800 seconds.

The treatment of the dyed polyvinyl alcohol film with boric acid may be carried out by immersing the film in an aqueous solution of boric acid. In the aqueous solution of boric acid, the boric acid is conventionally present in an amount of 2 to 15 parts by weight, preferably 5 to 12 parts by weight, based on 100 parts by weight of water.

When the iodine is used as a dichroic pigment, the aqueous solution of boric acid conventionally contains potassium iodide in an amount of 0.1 to 15 parts by weight, preferably 5 to 12 parts by weight, based on 100 parts by weight of water. The temperature of the aqueous solution of boric acid is conventionally 50° C. or higher, preferably ranges from 50 to 85° C., more preferably ranges from 60 to 80° C., and the time of immersing conventionally ranges from 60 to 1,200 seconds, preferably 150 to 600 seconds, more preferably 200 to 400 seconds.

After treating with boric acid, the polyvinyl alcohol film is conventionally washed and dried. The washing may be carried out by immersing the boric acid-treated polyvinyl alcohol film in water. In the washing step, the temperature of water conventionally ranges from 5 to 40° C., and the time of immersing conventionally ranges from 1 to 120 seconds. The washed polyvinyl alcohol film is dried to give a polarizer. The drying may be carried out using a hot-air dryer or a far-infrared heater. The drying temperature conventionally ranges from 30 to 100° C., preferably 50 to 80° C., and the drying time conventionally ranges from 60 to 600 seconds, preferably 120 to 600 seconds.

<Adhesive Layer>

In one embodiment of the present invention, the adhesive layer comes into direct contact with the polarizer without an additional protective film to achieve the slimness and light weight of the polarizing plate. Also, the adhesive layer is obtained from an adhesive composition for a polarizing plate which is known in the art.

In one embodiment of the present invention, the adhesive composition comprises an acrylic copolymer and a cross-linking agent.

The acrylic copolymer may be a copolymer of a (meth) acrylate monomer having a $C_{1-12}$ alkyl group and a polymerizable monomer having a cross-linking functional group.

The (meth)acrylate refers to acrylate and methacrylate.

Specific examples of the (meth)acrylate monomer having a $C_{1-12}$ alkyl group may include n-butyl(meth)acrylate, 2-butyl(meth)acrylate, t-butyl(meth)acrylate, 2-ethylhexyl (meth)acrylate, ethyl (meth)acrylate, methyl (meth)acrylate, n-propyl(meth)acrylate, isopropyl(meth)acrylate, pentyl (meth)acrylate, n-octyl(meth)acrylate, isooctyl(meth)acrylate, nonyl (meth)acrylate, decyl (meth)acrylate, lauryl (meth)acrylate, etc. Among these, n-butyl acrylate, 2-ethylhexyl acrylate, and a mixture thereof are preferred. These monomers may be used alone or in combination of two or more.

The polymerizable monomer having a cross-linking functional group is used to improve the cohesive strength or adhesive strength of the adhesive composition through chemical bonding, thereby providing durability and cutting property, and may include a monomer having a hydroxyl group, and a monomer having a carboxyl group. These monomers may be used alone or in combination of two or more.

Examples of the monomer having a hydroxyl group may include 2-hydroxyethyl(meth)acrylate, 2-hydroxypropyl (meth)acrylate, 2-hydroxybutyl(meth)acrylate, 4-hydroxybutyl(meth)acrylate, 6-hydroxyhexyl(meth)acrylate, 2-hydroxyethyleneglycol (meth)acrylate, 2-hydroxypropyleneglycol (meth)acrylate, hydroxyalkyleneglycol (meth)acrylate having a $C_{2-4}$ alkylene group, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether, 10-hydroxydecyl vinyl ether, etc. Among these, 2-hydroxyethyl(meth)acrylate and 4-hydroxybutyl vinyl ether are preferred.

Examples of the monomer having a carboxyl group may include monobasic acids such as (meth)acrylic acid and crotonic acid; dibasic acids such as maleic acid, itaconic acid and fumaric acid, and monoalkylesters thereof; 3-(meth) acryloylpropionic acid; succinic anhydride ring-opening adducts of 2-hydroxyalkyl (meth)acrylate having a $C_{2-3}$ alkyl group, succinic anhydride ring-opening adducts of hydroxyalkyleneglycol (meth)acrylate having a $C_{2-4}$ alkylene group, compounds obtained by ring-opening addition of succinic anhydride to carprolactone adduct of 2-hydroxyalkyl (meth)acrylate having a $C_{2-3}$ alkyl group, etc. Among these, (meth)acrylic acid is preferred.

The polymerizable monomer having a cross-linking functional group is preferably present in an amount of 0.05 to 10 parts by weight, more preferably 0.1 to 8 parts by weight, based on 100 parts by weight of the (meth)acrylate monomer having a $C_{1-2}$ alkyl group. If the amount of the polymerizable monomer having a cross-linking functional group is less than 0.05 parts by weight, the cohesive strength may be lowered to deteriorate durability. If the amount of the polymerizable monomer having a cross-linking functional group is more than 10 parts by weight, the adhesive strength may be deteriorated by high gel fraction to cause durability problems.

The acrylic copolymer may further comprise a polymerizable monomer other than the above monomers within the range that does not deteriorate adhesive strength, for example, in an amount of 10 wt % or less based on the total weight of the acrylic copolymer.

The copolymer can be prepared, without limitation, using bulk polymerization, solution polymerization, emulsion polymerization or suspension polymerization, etc. which are conventionally known in the art. Among these, the solution polymerization is preferred. Further, a solvent, a polymerization initiator, a chain transfer agent for controlling the molecular weight, etc. which are conventionally known in the art can be used for the polymerization.

The acrylic copolymer may have a weight average molecular weight (polystyrene-converted, $M_w$) of 50,000 to 2,000,000, preferably 400,000 to 2,000,000, as measured by gel permeation chromatography (GPC). If the weight average molecular weight is less than 50,000, the cohesiveness of the copolymer may be insufficient to degrade adhesive durability. If the weight average molecular weight is higher than 2,000,000, a large amount of a dilution solvent may be required to ensure the processibility of a coating process.

In one embodiment of the present invention, the cross-linking agent is used to enhance adhesion and durability and to maintain reliability at a high temperature and the form of the adhesive. By way of examples, the cross-linking agent may include, without limitation, isocyanate compounds, epoxy compounds, peroxide compounds, metal chelate compounds, oxazoline compounds, etc. These compounds may be used alone or in combination of two or more. Among these, isocyanate compounds are preferred.

Specifically, diisocyanate compounds such as tolylene diisocyanate, xylene diisocyanate, hexamethylene diisocyanate, 2,4- or 4,4-diphenylmethane diisocyanate; and adducts of polyhydric alcohol compounds such as trimethylolpropane to the diisocyanate compounds may be used.

In addition to the isocyanate cross-linking agent, at least one cross-linking agent selected from the group consisting of melamine derivatives such as hexamethylolmelamine, hexamethoxymethylmelamine, hexabutoxymethylmelamine, etc.; polyepoxy compounds such as an epoxy compound obtained from condensation of bisphenol A and epichlorohydrin; polyglycidyl ether of polyoxyalkylene polyol, glycerol diglycidyl ether, glycerol triglycidyl ether, and tetraglycidyl xylene diamine may be further used.

The cross-linking agent may be preferably contained in an amount of 0.1 to 15 parts by weight, more preferably 0.1 to 5 parts by weight, based on 100 parts by weight of the acrylic copolymer. If the amount of the cross-linking agent is less than 0.1 parts by weight, the cohesive strength may be decreased due to insufficient cross-linking, thereby resulting in durability deterioration and damaging cutting property. If the amount of the cross-linking agent is more than 15 parts by weight, the residual stress cannot be sufficiently relaxed due to excessive cross-linking.

The adhesive composition according to one embodiment of the present invention may further comprise a silane coupling agent.

The silane coupling agent may include, without limitation, vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, etc. These compounds may be used alone or in combination of two or more.

The silane coupling agent is preferably present in an amount of 0.01 to 5 parts by weight, more preferably 0.1 to 5 parts by weight, based on 100 parts by weight of the acrylic copolymer. If the amount of the silane coupling agent is less than 0.01 parts by weight, it is difficult to improve durability. If the amount of the silane coupling agent is more than 5 parts by weight, the cohesive strength excessively increases to deteriorate adhesiveness, thereby deteriorating durability.

The adhesive composition according to one embodiment of the present invention, if necessary, may further comprise an additive such as an adhesion enhancing resin, an antioxidant, an anticorrosive agent, a leveling agent, a surface lubricant, a dye, a pigment, a defoaming agent, a filler, a light stabilizer and an antistatic agent, in order to control adhesion, cohesion, viscosity, elasticity, glass transition temperature, etc.

The adhesive composition comprising the above-mentioned components is applied on a polarizer surface other than the polarizer surface having the protective film formed thereon, thereby forming an adhesive layer.

The applying method is not particularly limited if it is conventionally used in the art. For example, various methods including Meyer bar coating, gravure coating, die coating, dip coating and spraying may be used.

The thickness of the adhesive layer formed is not particularly limited, and it may be 3 to 100 μm, preferably 10 to 100 μm.

The ultra thin polarizing plate of the present invention may be applied to typical liquid crystal display devices. Particularly, the polarizing plate may be used to fabricate a liquid crystal display device including a liquid crystal panel wherein the polarizing plate having the adhesive layer is laminated on at least one side of a liquid crystal cell.

Therefore, one embodiment of the present invention relates to a liquid crystal display device having the ultra thin polarizing plate on at least one side of a liquid crystal cell.

The present invention is further illustrated by the following examples, comparative examples and experimental examples, which are not to be construed to limit the scope of the invention.

Preparation Example 1: Preparation of Polarizer

A 60 μm-thick polyvinyl alcohol resin film having an average polymerization degree of 2,400 and a saponification degree of 99.9 mol % or more was subject to dry uniaxial stretching about 5 times, and immersed in 60° C. distilled water for 1 minute with maintaining a state of tension. The film was immersed in an aqueous solution of iodine/potassium iodide/water (0.05/5/100, weight ratio) at 28° C. for 60 seconds. Then, the film was immersed in an aqueous solution of potassium iodide/boric acid/water (8.5/8.5/100, weight ratio) at 72° C. for 300 seconds. Subsequently, the film was washed with 26° C. distilled water for 20 seconds and dried at 65° C. to give a polarizer having iodine adsorbed and aligned on the polyvinyl alcohol resin film. The polarizer had a thickness of 22 μm.

Preparation Example 2: Preparation of Unreworkable Adhesive Layer-Forming Composition 3 Parts by weight of an acetoacetyl-modified polyvinyl alcohol resin (Cosenol Z200, Nippon Synthetic Chemical Industry) and 0.3 parts by weight of a glyoxal-based cross-linking agent (SPM-0.1, Nippon Kohsei) were added to 100 parts by weight of water to give an unreworkable adhesive composition. To 100 parts by weight of the composition was added 50 parts by weight of copper sulfate to give an unreworkable adhesive layer-forming composition.

Preparation Example 3: Preparation of Adhesive Composition

To a 1 L reactor equipped with a cooler and subjected to nitrogen gas flow were added a monomer mixture consisting of 95 parts by weight of n-butyl acrylate (BA), 4 parts by weight of acrylic acid and 1 part by weight of 2-hydroxyethyl acrylate, and then 100 parts by weight of ethyl acetate as a solvent. Then, nitrogen gas was purged for 1 hour to remove oxygen, followed by maintaining the temperature to 62° C. After uniformly stirring the mixture, 0.07 parts by weight of azobisisobutyronitrile (AIBN) as a reaction initiator was added thereto, and the resulting mixture was reacted for 6 hours to give an acrylic copolymer having a weight average molecular weight of about 1,000,000.

100 Parts by weight of the acrylic copolymer, 1.0 part by weight of a cross-linking agent (Coronate-L, Nippon Polyurethane Industry) and 0.5 parts by weight of a silane coupling agent (KBM-403, Shin-Etsu) were mixed, and the mixture was diluted with methyl ethyl ketone for the purpose of providing coating property, to give an adhesive composition.

Experimental Example 1: Measurement of Residual Force

Experimental Example 1-1: Measurement of Shrinkage Rate of Polarizer

The polarizer prepared in Preparation Example 1 was cut into a certain size (24 mm-length, 2 mm-width) in the direction of stretching, and then its shrinkage rate was measured using Rheometer (Anton Paar, MCR-302) at 25 t for 12 hours.

Experimental Example 1-2: Measurement of Elastic Modulus of Polarizer

The polarizer prepared in Preparation Example 1 was cut into a certain size (100 mm-length, 5 mm-width) in the direction of stretching, and then its elastic modulus was measured using a universal testing machine (UTM, Shimadzu, AG-X).

Experimental Example 1-3: Measurement of Residual Force

The shrinkage rate and the elastic modulus measured above were used in the following Equation 2 to calculate a residual force of the polarizer when being shrunk at room temperature. The result was shown to be 2.1 N, which was calculated from a cross-sectional area when the width is 2 mm.

$$\text{Force} = E \times \varepsilon \times A \quad \text{[Equation 2]}$$

wherein,
Force is a residual force of the polarizer,
E is an elastic modulus (MPa) of the polarizer,
$\varepsilon$ is a shrinkage rate of the polarizer, and
A is a cross-sectional area (mm$^2$) of the polarizer.

Experimental Example 2: Measurement of Resisting Force

Experimental Example 2-1: Measurement of Elastic Modulus of Protective Film Each protective film shown in Table 1 was cut into a certain size (100 mm-length, 5 mm-width) in the direction of stretching, and then its elastic modulus was measured using a universal testing machine (UTM, Shimadzu, AG-X).

Experimental Example 2-2: Measurement of Resisting Force

The shrinkage rate of the polarizer and the elastic modulus of the protective film measured above were used in Equation 1 to calculate a resisting force of the protective film. The results were shown in Table 1.

Examples 1 to 17 and Comparative Examples 1 to 11: Preparation of Ultra Thin Polarizing Plate The unreworkable adhesive layer-forming composition prepared in Preparation Example 2 was applied on one surface of the polarizer prepared in Preparation Example 1 so that its dried layer thickness was 0.1 μm, followed by lamination with a protective film (400 cm×400 cm) shown in Table 1. The laminate was dried at 60° C. for 5 minutes to give a polarizing plate.

The other surface of the polarizer having a protective film was applied with the adhesive composition prepared in Preparation Example 3 so that the dried adhesive layer thickness was 25 μm. The resulting plate was dried at 100° C. for 1 minute to give an ultra thin polarizing plate with an adhesive layer.

Experimental Example 3: Measurement of Amount of Curl

A curled sample was put on a base plane, such as a flat surface on a table, so that the concavely curled surface thereof was faced upwards, and humidity control was carried out under the condition of 25° C. and 65% RH for 48 hours. The sample was cut into a rectangle piece of a 305 mm-long side and a 254 mm-short side so that each side was inclined at an angle of 45° with respect to the film-forming direction of the polarizing plate. Among two diagonal lines of the humidity-controlled sample, the diagonal line making an angle closer to the film-forming direction of the polarizing plate was measured for its heights raised from the base plane at two end points. An average of the measurements was determined as an amount of curl of the polarizing plate. The results were shown in Table 1.

<Evaluation Criteria>
○: amount of curl not more than 5 mm
Δ: amount of curl not more than 15 mm
x: amount of curl more than 15 mm

TABLE 1

|  | Protective Film | Elastic Modulus (MPa) | Cross-sectional Area (mm$^2$) | Resisting Force (N) | Amount of Curl (mm) | Evaluation of Curl |
| --- | --- | --- | --- | --- | --- | --- |
| Example 1 | SRF-PET | 5054 | 0.160 | 2.99 | 3.5 | ○ |
| Example 2 | TAC | 2976 | 0.200 | 2.20 | 4.5 | ○ |
| Example 3 | SRF-PET | 5054 | 0.200 | 3.74 | 2.0 | ○ |
| Example 4 | PET | 3738 | 0.200 | 2.77 | 3.0 | ○ |
| Example 5 | SRF-PET | 5054 | 0.240 | 4.49 | 1.5 | ○ |
| Example 6 | TAC | 2976 | 0.300 | 3.30 | 3.0 | ○ |
| Example 7 | SRF-PET | 5054 | 0.300 | 5.61 | 1.0 | ○ |
| Example 8 | PET | 3738 | 0.300 | 4.15 | 2.0 | ○ |
| Example 9 | TAC | 2976 | 0.500 | 5.51 | 1.0 | ○ |
| Example 10 | SRF-PET | 5054 | 0.500 | 9.35 | 0.5 | ○ |
| Example 11 | PMMA | 1520 | 0.500 | 2.81 | 3.0 | ○ |
| Example 12 | PET | 3738 | 0.500 | 6.92 | 1.0 | ○ |
| Example 13 | COP | 1543 | 0.500 | 2.85 | 3.5 | ○ |
| Example 14 | TAC | 2976 | 0.800 | 8.81 | 0.5 | ○ |
| Example 15 | SRF-PET | 5054 | 0.800 | 14.96 | 0 | ○ |

TABLE 1-continued

|  | Protective Film | Elastic Modulus (MPa) | Cross-sectional Area (mm²) | Resisting Force (N) | Amount of Curl (mm) | Evaluation of Curl |
|---|---|---|---|---|---|---|
| Example 16 | PMMA | 1520 | 0.800 | 4.50 | 0.0 | ○ |
| Example 17 | COP | 1543 | 0.800 | 4.57 | 2.0 | ○ |
| Com. Example 1 | TAC | 2976 | 0.050 | 0.55 | 40.0 | X |
| Com. Example 2 | PET | 3738 | 0.076 | 1.05 | 24.5 | X |
| Com. Example 3 | SRF-PET | 5054 | 0.100 | 1.87 | 11.0 | Δ |
| Com. Example 4 | PET | 3738 | 0.100 | 1.38 | 13.0 | Δ |
| Com. Example 5 | COP | 1543 | 0.100 | 0.57 | 42.0 | X |
| Com. Example 6 | TAC | 2976 | 0.120 | 1.32 | 17.0 | X |
| Com. Example 7 | PMMA | 1520 | 0.120 | 0.67 | 35.0 | X |
| Com. Example 8 | TAC | 2976 | 0.160 | 1.76 | 11.0 | Δ |
| Com. Example 9 | PMMA | 1520 | 0.160 | 0.90 | 33.0 | X |
| Com. Example 10 | COP | 1543 | 0.200 | 1.14 | 13.0 | Δ |
| Com. Example 11 | PMMA | 1520 | 0.300 | 1.69 | 11.5 | Δ |

SRF-PET: uniaxially stretched polyethylene terephthalate film
TAC: saponified triacetyl cellulose film
PET: polyethylene terephthalate film
PMMA: polymethyl methacrylate film
COP: cycloolefin polymer film As shown in Table 1, the ultra thin polarizing plates of Examples 1 to 17 according to the present invention exhibited substantially less amount of curl, as compared with those of Comparative Examples 1 to 11 wherein the resisting force of the protective film is less than 2.1 N.

Also, in the case that the resisting force of the protective film is higher than 18.7 N, it cannot be applied in an ultra thin polarizing plate because the thickness of the protective film is excessively thick.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

The invention claimed is:

1. A polarizing plate comprising
a polarizer having a first surface and a second surface opposite to the first surface,
a protective film formed only on the first surface of the polarizer, and
an adhesive layer formed on the second surface of the polarizer,
wherein the protective film has a resisting force of 2.2 to 14.96 N, and
the resisting force of the protective film is defined by the following Equation (1):

$$\text{Force} = E \times \varepsilon \times A \quad \text{Equation (1)}$$

wherein,
Force is a resisting force of the protective film,
E is an elastic modulus (MPa) of the protective film and is in a range from 1520 to 5054,
ε is a shrinkage rate of the polarizer, and
A is a cross-sectional area (mm²) of the protective film and is in a range from 0.16 to 0.80.

2. The polarizing plate of claim 1, wherein the protective film is selected from the group consisting of a polyester film, a cellulose film, an acrylate film, and a polyolefin film.

3. The polarizing plate of claim 1, wherein the protective film is a polyethylene terephthalate film, a triacetyl cellulose film, a polymethyl (meth)acrylate film or a cycloolefin polymer film.

4. A liquid crystal display device comprising
a liquid crystal cell; and
the polarizing plate of claim 1 on at least one side of the liquid crystal cell.

5. A liquid crystal display device comprising
a liquid crystal cell; and
the polarizing plate of claim 2 on at least one side of the liquid crystal cell.

6. A liquid crystal display device comprising
a liquid crystal cell; and
the polarizing plate of claim 3 on at least one side of the liquid crystal cell.

* * * * *